(No Model.)
W. G. RILEY.
TRACE LOOP.
No. 246,819. Patented Sept. 6, 1881.
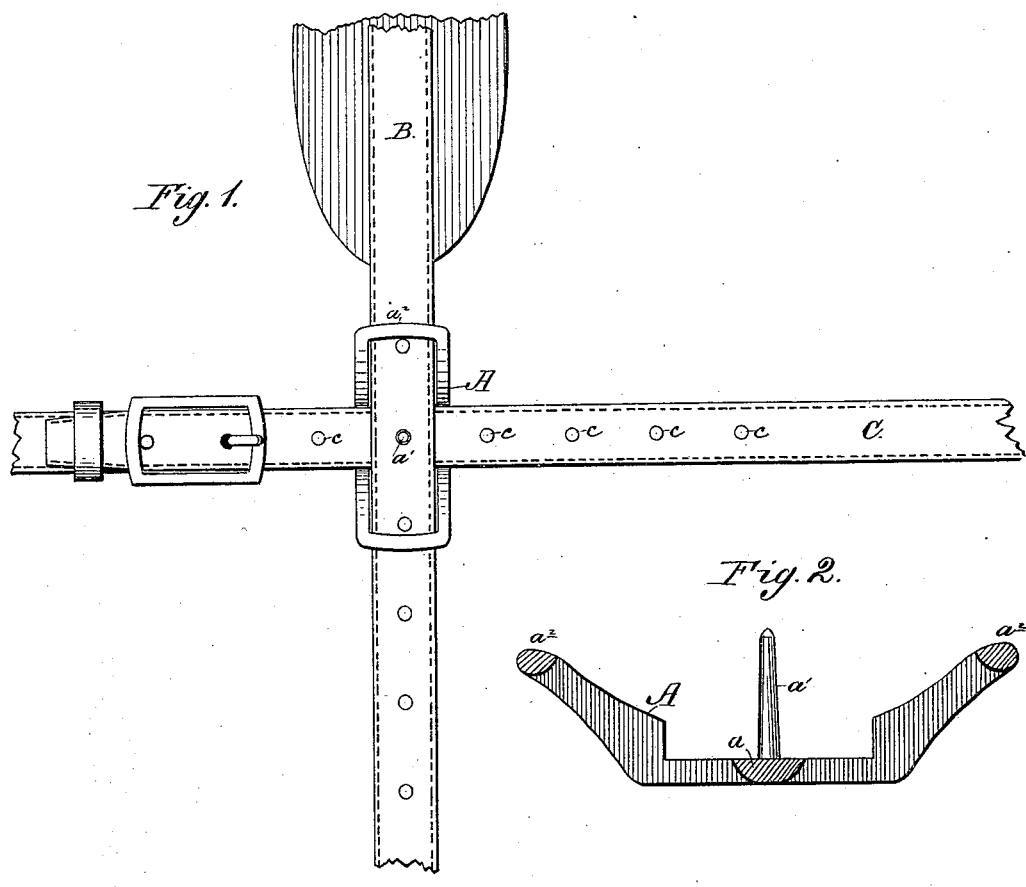
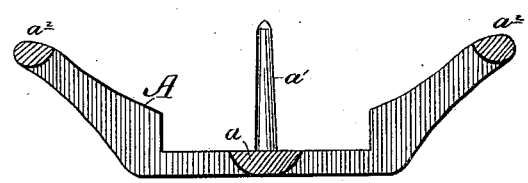
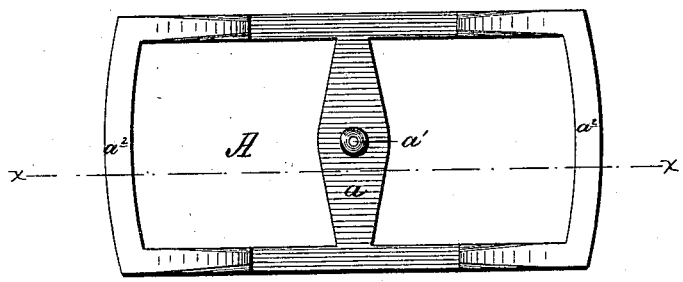
WITNESSES:
W. W. Hollingsworth
A. G. Lyne
INVENTOR:
Wm. G. Riley
BY
ATTORNEYS.

UNITED STATES PATENT OFFICE.

WILLIAM G. RILEY, OF CORYDON, IOWA.

TRACE-LOOP.

SPECIFICATION forming part of Letters Patent No. 246,819, dated September 6, 1881.

Application filed January 14, 1881. (No model.)

*To all whom it may concern:*

Be it known that I, WILLIAM G. RILEY, a citizen of the United States, residing at Corydon, in the county of Wayne and State of Iowa, have invented a new and useful Adjustable Trace-Loop, of which the following is a full, clear, and exact description, reference being had to the drawings hereto annexed.

The object of my invention is to provide a simple and inexpensive loop for attaching a back-band of a harness to a trace in an adjustable manner, so that the back-band can be easily moved forward or backward, as well as lengthened or shortened, to accommodate the different sizes of horses.

In the accompanying drawings, Figure 1 shows the application of my loop to a trace and back-band; Fig. 2, a sectional view of the loop, taken on line $x\,x$ of Fig. 3; and Fig. 3 a top view.

A represents a vertically and laterally adjustable trace-loop for securing a back-band to a trace, made of cast malleable iron, having end loops, $a^2$, and provided with deep rectangular recesses cut crosswise at its center to form a bed for the trace, which is secured at right angles to the back-band, the said loop having a narrow central plate and rigid pin, whereby the back-band may be allowed sufficient room for being easily adjusted. The said loop is applied by placing the trace C across the loop, so that it will fit against the said plate and be held in position by the pin $a'$, which passes through one of a series of perforations, $c$, in the trace. The loops will be thus in a vertical position, and the end of the back-band B, which is provided with a series of perforations, is passed downward through the two loops, crossing the trace at right angles, and is secured in any desired position by the said pin.

For the more convenient use of my loop I arrange the buckle by which the trace is secured to the hame as near to the hame as possible. This gives room for sliding the loop forward to adapt the harness to very small horses, while it may be moved either backward or forward for the purpose of relieving pressure upon any tender part of the animal's back. At the same time, it will be seen, the back-band may be lengthened or shortened, as required, without the slightest inconvenience.

The sides of this loop adjacent to the central plate may be recessed, as in Fig. 2, for receiving and holding the trace more securely.

Having thus fully described my invention, what I claim as new, and desire to secure by Letters Patent, is—

The vertically and laterally adjustable trace-loop having deep rectangular recesses cut crosswise at the center for snugly holding the trace, and a central pin-plate made narrow to allow the back-band sufficient room for being easily adjusted, substantially as shown and described.

WILLIAM G. RILEY.

Witnesses:
 EUGENE H. WILSON,
 THOMAS G. RILEY.